United States Patent [19]

Eberwein

[11] 4,350,979

[45] Sep. 21, 1982

[54] SYSTEM AND METHOD FOR WELL-LOGGING

[75] Inventor: Valery D. Eberwein, Houston, Tex.

[73] Assignee: Dresser Industries, Inc., Dallas, Tex.

[21] Appl. No.: 30,056

[22] Filed: Apr. 13, 1979

Related U.S. Application Data

[63] Continuation-in-part of Ser. No. 949,592, Oct. 10, 1978.

[51] Int. Cl.³ .............................................. G01V 1/40
[52] U.S. Cl. .................................... 340/861; 340/857; 364/422; 370/78; 328/118
[58] Field of Search ........................ 367/25, 28, 30, 33, 367/34, 35, 81; 340/856–861, 167 A; 364/422, 200; 370/78; 328/118, 111, 112

[56] References Cited

U.S. PATENT DOCUMENTS

| | | | |
|---|---|---|---|
| 3,711,651 | 1/1973 | Connell | 370/78 |
| 3,720,912 | 3/1973 | Schmidt | 367/33 |
| 3,735,271 | 5/1973 | Leibowitz | 328/112 |
| 3,792,430 | 2/1974 | Niven | 340/860 |
| 3,824,533 | 7/1974 | Adamson | 364/422 |
| 3,827,026 | 7/1974 | Viswanathan | 340/167 A |
| 3,991,611 | 11/1976 | Marshall et al. | |
| 4,012,712 | 3/1977 | Nelbgan | 340/857 |
| 4,216,536 | 8/1980 | More | 73/152 |
| 4,227,404 | 10/1980 | West | 364/422 |

FOREIGN PATENT DOCUMENTS

885572 7/1949 Fed. Rep. of Germany ........ 370/78

OTHER PUBLICATIONS

"Direct Digital Logging," Gearhart-Owen Advertising Brochure, 1977.
"Wellsite Formation Analysis" using the DDL Computer, Head, Society of Petroleum Engineers, Paper SPE6J41 Apr. 1977, conference paper.

Primary Examiner—Howard A. Birmiel
Attorney, Agent, or Firm—Richard M Byron; Patrick H. McCollum

[57] ABSTRACT

An improved system and method is provided for obtaining information related to subsurface earth formations. Well-logging data from an input terminal is processed and stored in a memory by a first processor. A second processor retrieves this data from the same memory, and further processes the data, which is then transferred to an output terminal device. The first processor obtains access to memory or the input terminal for delivering or retrieving data during pulses of a first pulse train generated by a clock. The second processor obtains access to the same memory or the output terminal for delivery or retrieval of data during pulses of a second pulse train generated by the clock. Performance of each processor's respective functions is synchronized by storage and retrieval of messages by both processors in the common memory.

20 Claims, 2 Drawing Figures

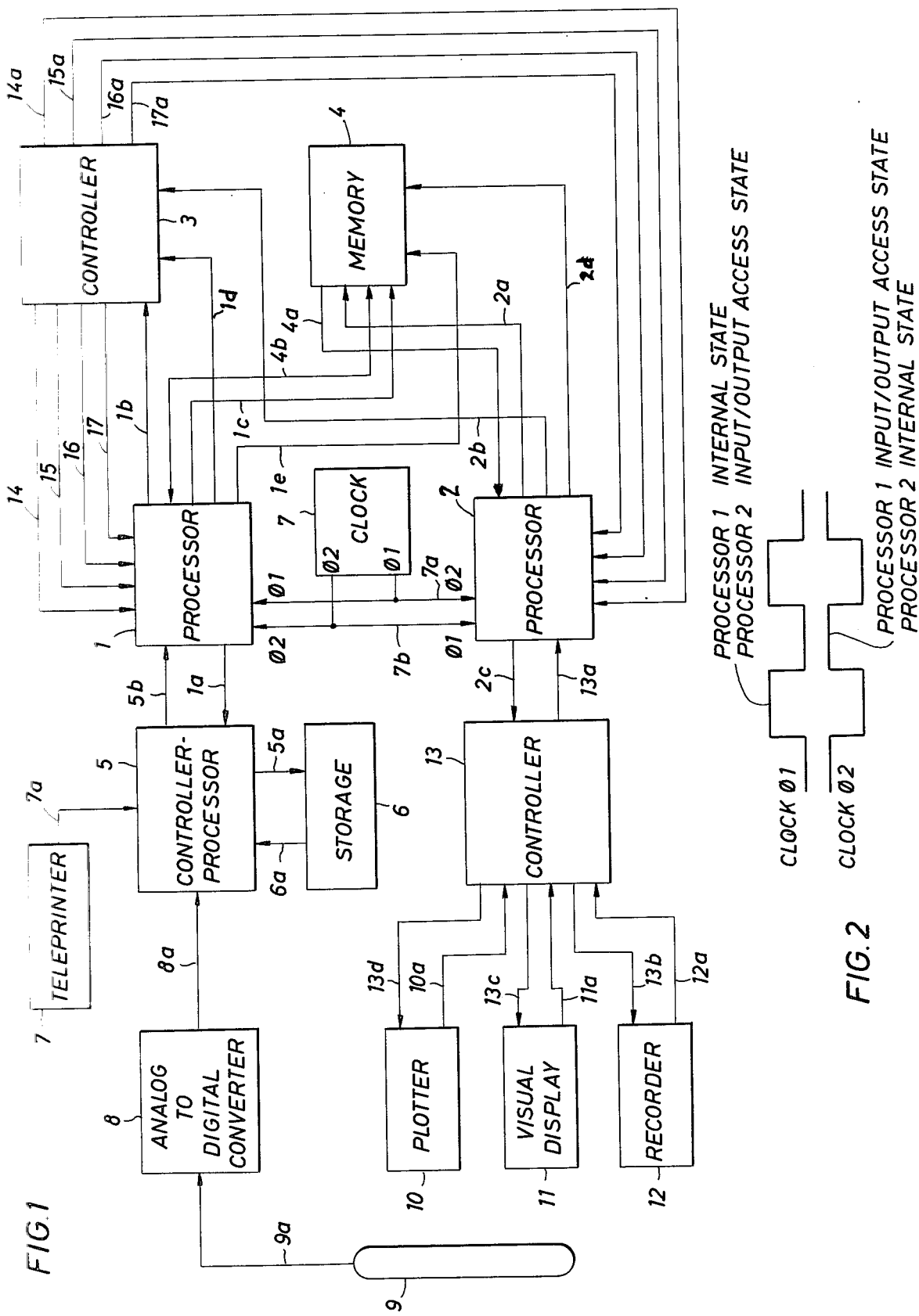

4,350,979

SYSTEM AND METHOD FOR WELL-LOGGING

RELATED CASES

This application is a continuation-in-part of Ser. No. 949,592, which was filed October 10, 1978.

BACKGROUND OF THE INVENTION

This invention relates to improved methods and apparatus for obtaining well-logging information, and more particularly relates to improved methods and apparatus for efficiently transforming digital well logging information into a more useful and informative format.

It is conventional practice in the search for petroleum substances residing in subsurface earth formations to drill boreholes into such formations, and to survey the earth materials along the length of the boreholes to determine possible locations therein where oil or gas may be recovered. These boreholes are normally surveyed or "logged" by passing a "sonde" through the borehole which contains devices capable of measuring various lithological parameters of interest, and thereafter recovering these measurements on the surface for analysis.

In the early history of well logging, logging measurements were relatively simple and severely limited by factors such as equipment and the like. Moreover, log data analysis techniques were somewhat unsophisticated and data processing limitations were accordingly not of particular significance. However, as the art of well logging progressed, measurements and log analysis techniques have become far more complex, such that massive amounts of logging information are being generated and in relatively short periods of time, and often require analysis and processing in correlatively small time periods. For example, a well logging system of the type depicted and described in the aforesaid U.S. patent application Ser. No. 949,592, has been developed for simultaneously generating and transmitting to the surface complex measurements from a plurality of logging tools. Moreover, not only has the number of parameters being simultaneously measured increased, but as previously noted the rate at which these measurements are available for processing has increased tremendously. This may be due to a number of factors, including the faster rate at which the sonde is now caused to traverse the borehole and thus generate measurements, the increasingly smaller increments of borehole which must be sampled, and the statistical nature of some of the more modern logging tools.

Still further, demand for more efficient processing of well logging information has not only been created by the increased complexity and arrival rate of information generated from within the borehole, but from other considerations as well. For example, as the science of well log analysis continues to develop, more complex relationships between measured parameters are being discovered, which require attendant increases in processing time to transform these measurements into newly derived functions. Moreover, demands for improved methods for effective visual display of logs so as to be more informative and useful have still further compounded the problem. It has been found desirable, for example, to cause derived measurements to be presented in graphical form on a suitable terminal device, such as a video display of high resolution capability wherein the various measurements must be scaled appropriately, and wherein various additional features such as display of reference grid lines lithological symbols, alpha-numeric messages, and the like, all functionally related to these measurements, may also be displayed. Accordingly, additional time must be devoted to the generation of data related to these functions. The combination of this data with the derived well logging information further compounds the problem of increasing the data transfer rate of well logging information processing systems which have already been taxed to their limits.

One attempted solution to the hereinbefore noted problems caused by the tremendous increase in volume and required rate of processing of information generated in a modern well logging operation is to produce logs at a decreased rate so as to provide additional time for information processing. Due to the tremendous capital investments in equipment and labor costs associated with logging and drilling operations, however, it is highly undesirable to extend the time required to produce measurements so as to permit the processing at slower rates. Yet another attempt to solve the hereinbefore noted problems is to provide for high speed storage of information as it is generated, whereby it may be thereafter retrieved after a log is run and processed at much slower rates. However, even after a log has been made, it is often undesirable to further tie up logging and drilling equipment and labor by decisions regarding the well which must be delayed while the vast amount of information, is being processed, displayed and analyzed.

Still another attempt to alleviate the requirements for more efficient information processing and data transfer rates in modern well logging operations has been to divide the computational tasks which must be performed in the analysis and transformation of logging information between two processors which may be operating simultaneously. For example, it is known that one processor may process data and store results in a first memory while a second processor simultaneously processes different data and stores results in a second memory, after which the two memories may be interchanged so as to enable the second processor to thereafter further process data resulting from the first processor's operations. However, it has been found that attempts to provide for such simultaneous operation of processors creates still further problems and often require two large computers which are unsuitable for remote well site logging operations. For example, it frequently takes more time to coordinate the functions being performed by each controller than is saved by the fact that they are processing information simultaneously. Excessive time is required to interchange memories or to detect when both processors hve completed their tasks and are ready for transfer. Moreover, one processor may have to remain idle until the other processor completes its tasks.

Thus, in summary, it will be seen that due to large quantities of logging information produced at high data rates, it would be desirable to significantly increase the rate at which this data is processed and transferred. This would allow for production of more elaborate and useful information in real time during a logging operation so as to permit enhanced monitoring and adjustment, as well as to decrease the time necessary to provide permanent visible records of the logging operation. It has been seen that a solution to the hereinbefore noted problems must avoid "tying up" a well and associated equipment either during the logging process by slowing down the logging rate or taking multiple passes through the borehole, or after the log has been produced. Thus, it is desirable to minimize the processing time after a log is made as well as during the log, so as to produce logs quickly, provide additional information during the logging process in real time so that portions of the borehole may be relogged or the like if desired, and to permit generation of time consuming visible records of logging data during a logging operation. Moreover, it is also desirable to achieve these results with equipment which is relatively light, compact, and suitable for portable operation in a logging truck at well site.

The disadvantages hereinbefore noted are overcome with the present invention, and novel means and methods are provided for efficiently processing and transferring well logging information. A novel system and method is provided for processing well logging information at high data transfer rates, which not only improves the logging operation and amount of information which may be presented, and eliminates the need to restrict logging rates or occupy wells, equipment, and personnel for unnecessarily long periods, but does so with compact and light apparatus suited to mobile operations.

SUMMARY OF THE INVENTION

In a particularly suitable embodiment of the present invention, a system and method for obtaining well logging information is provided having an input terminal for providing well logging data to be processed, an output terminal for receiving the processed data, and a first and second processor for processing the data. A memory is provided for storing both processed and unprocessed data. The first processor, which is interconnected between the input terminal and the memory, receives logging data, stores it in the memory, retrieves and processes it, and stores the processed data in the memory. The second processor is interconnected between the memory and the output terminal. This processor retrieves the data previously processed and stored by the first processor, further processes the data, stores it, and then retrieves it and delivers it to the output terminal for visual display, recording, or the like. A clock or other pulse generator is provided for generating a first train of enabling pulses which is delivered to the first processor and a second train of pulses to be delivered to the second processor. Pulses from the first train will enable the first processor to either store data in or retrieve data from the memory or in the input terminal in response to instructions delivered to the first processor from a controller. Pulses from the second train enable the second processor, in like manner, to either store data in or retrieve data from the memory also in response to instructions from the controller delivered to the second processor.

Pulses from the first train will, during their presence, isolate the first processor from the input terminal and memory. The first processor will thus be restricted from either receiving or transmitting information, and may only operate on information contained within the processor. During this time, the second processor will be enabled by these pulses to have access to incoming information from the memory or output terminal, or may transfer information on its outputs to the memory or output terminal in response to instructions delivered to the second processor from a controller. During the occurrence of pulses of the second train, the operation of the processors is reversed, whereby the first processor now may either transmit data to the input terminal or memory, or receive information from the input terminal memory in response to instructions from the controller delivered to the second processor, while the second processor is only performing operations internal to the processor. In a particular embodiment of the present invention, the hereinbefore noted memory is preferably common to both processors, whereby either processor, during the pulses in which the particular processor has access to incoming information or may transfer information, may either receive information from or transmit information for storage in the aforesaid common memory device.

As will be hereinafter explained in greater detail, provision is made for dividing the previously noted sets of functions to be performed by the processors whereby the first processor may perform operations on data which will thereafter be received by the second processor for further processing by the second processor prior to the processed information being transferred by the second processor to the output terminal, which preferably may include a tape recorder, plotter, visual display, or the like. In a particularly suitable embodiment of the present invention, a portion of the memory common to both processors is reserved for coordinating the functions performed by both processors. More particularly, a number having a predetermined permissable range is stored in a memory location accessible to both processors. Each time the first processor has processed and stored a block of data, the number contained in the memory location is incremented. Conversely, each time the second processor has retrieved this block of information, performed additional operations on it, stored it in memory, and thereafter transferred it to the output terminal as previously described, the number in the memory location is decremented. So long as the number is within the predetermined range, the first processor will continue to receive, process, and store new data, and the second processor will, in like manner, retrieve, further process, store, and thereafter output this data to the output terminal. However, if the number exceeds the permissable range, the first processor will stop receiving additional data from the input terminal whereas if the number reaches 0, the second processor will stop transferring the blocks of data to the output terminal. Thus, it will be appreciated that by interrogating the memory location common to both processors at appropriate times, each processor is regulating performance of its functions so as to be compatible with the rate at which the other processor is performing its respective functions. Moreover, this result is achieved without either processor interfering with the operation of the other processor and without the necessity for direct communication between processors whereby each processor may therefore be performing at its maximum rate so as to improve the overall information processing and transfer rate. it will be noted that this rate of processing and transfer, wherein a common memory is shared, is further enhanced by the previously noted synchronous operation of the processors' access to memory, whereby each processor is alternately enabled to have access to this common memory.

Accordingly, it is a feature of the present invention to provide an improved system and method for handling high data rate well logging information. In particular, it is a feature of the present invention to significantly increase the rate at which digital logging information is processed and transferred over similar methods by providing novel techniques for synchronizing operation of two information processors.

It is another feature of this invention to provide for improved processing and transferring of digital well logging data in remote or portable sites, wherein considerations of size, weight, power consumptions and the like of equipment must simultaneously be reduced.

It is another advantageous feature of the present invention to provide for a significant increase in the amount and usefulness of well logging information presented for visual display or recording during a logging operation, thereby increasing the quality of a particular log, while significantly reducing the size, weight, power consumption, and the like of equipment necessary to achieve these results.

It is a further feature of the hereindescribed invention to substantially improve the methods of synchronizing operation of two well logging information processors to an identical memory device, so as to significantly increase the rate at which logging information is processed and transferred.

It is another object of the present invention to significantly increase the amount of time during which each of two processors may have access to common memory.

It is a further feature of the hereindescribed invention to provide for improved coordination of two well-logging data processors to perform distinct sets of functions whereby the first processor performs a first set of functions followed by a second processor performing a next set of functions on the resulting information provided by operation of the first processor, and wherein the respective operations of the two processors are coordinated by means of common memory.

It is another feature of the present invention to significantly reduce the time required to generate permanent visual records of logging information at a remote well site location either during the logging operation or at a later time, whereby the record thus produced is more informative and useful, thus containing a significantly increased amount of data.

It is another feature of the present invention to provide a system for processing well logging measurements and the like, comprising input means for providing electrical data signals to be processed, terminal means for receiving processed electrical data signals, pulse generating means for providing electrical enabling pulses of alternate character, memory means for receiving and delivering electrical data signals, first processing means interconnected with said input and memory means for receiving and delivering data signals in functional relationship to selected ones of said enabling pulses and second processing means interconnected with said memory and terminal means for receiving and delivering data signals in functional relationship to selected ones of said enabling pulses.

It is a further feature of the present invention to provide a method of investigating the character of subsurface earth materials traversed by a borehole and the like, comprising deriving a train of input data signals functionally representative of measurements in said borehole, deriving a plurality of electrical enabling pulses, deriving a plurality of electrical command signals, selecting a portion of said train of data signals in functional relationship to one of said command signals and selected ones of said enabling pulses, processing said portion of said train of data signals in functional relationship to another of said command signals and other different ones of said enabling pulses, and storing said portion of said train of data signals in functional relationship to said selected ones of said enabling pulses.

These and other features and advantages of the present invention will become apparent from the following detailed description, wherein reference is made to the figures in the accompanying drawings.

IN THE DRAWINGS

FIG. 1 is a functional representation of the improved system and method for logging of the present invention.

FIG. 2 is a representation of the circuitry timing of a portion of the system of FIG. 1.

DETAILED DESCRIPTION OF THE DRAWINGS

Referring now to FIG. 1, there may be seen a simplified functional diagram of one embodiment of the logging information system of the present invention, wherein a processor 1 and processor 2 are provided for retrieving, processing, and transferring logging information in a coordinated fashion to be hereinafter described. Processors 1 and 2 will preferably be provided with a controller 3 and a memory 4. As is well known in the art, controller 3 and memory 4 may be "addressed" so as to cause desired information to be stored or "written" therein, or retrieved or "read" from them. When an "address command" is received by the controller 3 or memory 4, it will either read and transmit information stored therein at a particular "memory location" to a particular processor 1 or 2, or, will receive and write this information into a memory location in the controller 3 or memory 4 from a particular processor 1 or 2. The particular memory location, processor, and indication of whether a read or write operation is desired may be defined by the address command signal originating from the particular processor. Thus, for example, there will be seen in FIG. 1, address commands 1e and 1d, which are transferred from the processor 1 to memory 4 and the controller 3, respectively. The controller 3, after receiving command 1d, will either transfer information stored in the controller 3 to the processor 1 on controller outputs 14–17 in a manner to be described, or will store information received from the processor 1 on processor output 1b. Information defining whether the controller 3 will either transfer or store information, and the memory location within the controller 3 where the information will be transferred from or stored, will be carried on the address command 1d, as hereinbefore noted. Similarly, the address command 1e will cause the memory 4 to either transfer information stored therein to the processor 1 on the memory output 4b, or to receive information for storage on the processor output 1c. Address commands 2d from the processor 2, in like manner, will cause information from the processor 2 to be written into the memory 4 from the processor output 2a, or will cause information in the memory 4 to be transferred to the processor 2 on the memory output 4a. Still further, the address command 2b from the processor 2 will cause information from the controller 3 to be read and delivered to the processor 2 on the controller outputs 14a–17a.

Referring still to FIG. 1, there will be seen an input terminal for providing well logging data to the processor 1, comprised of a well logging sonde 9, and analog-to-digital converter 8, a teleprinter 7, and storage 6. Logging measurements derived by the sonde 9 are delivered by a means of a conductor or logging cable 9a to the converter 8, where they may be conventionally converted to digital form if required prior to delivery on the converter output 8a to a controller-processor 5. The teleprinter 7 is provided for enabling a well logging operator to instruct the controller-processor 5 by means of a teleprinter output 7a as to the initial information required by the processors 1 and 2 prior to commencing the logging operation. These instructions may include the starting depth of measurements from the sonde 9, the number of measurements to be made, scaling factors and the like well known in the art. There will be seen a storage 6 which may either receive and store information from the controller-processor 5 on controller-processor output 5a or may transfer such stored information to the controller-processor 5 in a manner to be described. The purpose of the storage 6 is twofold. First, it may provide by means of conventional digital tapes or the like, a series of instructions or "programs" to be performed by the processors 1 and 2 dependent upon the desired processing steps they must perform on incoming logging data. These programs will be transferred on the storage output 6a to the controller-processor 5 in response to a processor output 1a, and thereafter delivered to the processor 1 on the controller-processor output 5b. The processor 1 will thereafter deliver these instructions to the controller 3 by means of addressing the controller 3 on address command 1d, and delivering these instructions to the controller 3 on the processor output 1b in a conventional manner previously described. The second purpose of the storage 6 is to store well logging measurement data for retrieval. If historical well logging data has been recorded, for example, on magnetic tape, it may be desirable to "play back" the tape for further processing of this data. Thus the storage 6 may be provided for delivering this data to the controller-processor 5 in lieu of the measurements from the sonde 9, and this data will then, in turn, be delivered on the controller-processor output 5b to the processor 1 for further processing. It should be noted, however, that the storage 6 may be performing the function of storing and retrieving well logging data concurrently with the generation of measurements by the sonde 9. If the processor 1 is unable to receive additional well logging data generated by the sonde 9 for processing, for reasons to be hereinafter described, the processor 1 will generate a processor output 1a, commanding the controller-processor 5 to store this data in the storage 6, until the processor 1 is again able to resume processing this data, in which case it will be delivered to the controller-processor 5 on the storage output 6a, and thereafter to the processor 1 on the controller-processor output 5b.

There will also be seen in FIG. 1 a terminal means comprising a controller 13, a plotter 10, a visual display 11, and a recorder 12. Well logging data which has been processed by the processors 1 and 2 will be delivered on the processor output 2c to a controller 13. The controller 13 will thereafter deliver this processed data on the controller output 13d to the plotter 10 for generating permanent records of the logging data, such as a conventional film-type log or the like. The plotter 10 is provided with a plotter output 10a which will instruct the controller 13 as to when the plotter 10 has completed the task of printing the data received on controller output 13d and is thus available to receive more data. The visual display 11 may be provided for generating a visible indication of the processed logging data in response to the controller output 13c. In like manner to the plotter 10, the display 11 is provided with a display output 11a which will instruct the controller 13 when the display 11 has displayed the processed data supplied on the controller output 13c and is thus ready for more data. The recorder 12 is provided for storing the data processed by the processors 1 and 2 in a manner such as by means of a digital tape recorder or the like. This data is supplied to the recorder 12 from the controller output 13b. Also in like manner to the plotter output 10a, and the display output 11a, a recorder output 12a is provided for indicating to the controller 13 when the recorder 12 is available for receipt and storage of processed data. The controller 13, in response to these indications of the plotter output 10a, display output 11a, and recorder output 12a, will generate a control output 13a which will instruct the processor 2 as to whether the processor 2 may thus transfer additional process data on the processor output 2c for plotting, display, or recording.

Referring now more specifically to the operation of the processors 1 and 2 of FIG. 1, it will be noted that they are preferably of the type well known in the art, which may operate in two distinct states comprising a "machine cycle", which define the functions they perform at a particular time. During a first state or first half cycle of a complete machine cycle, a given processor 1 or 2 will be isolated from interaction with other devices, and accordingly will be restricted to performing internal calculations. In contrast, during a second state or second half cycle of the machine cycle, the given processor 1 or 2 will no longer be isolated, but rather will be permitted to perform functions which may include the receiving of information or "input" data or the transmission of information or "output" of data. It should, therefore, be readily apparent that the devices which a given processor 1 or 2 may have access to for either reading or writing information during its second half cycle will include the memory 4 and controller 3, as hereinbefore described.

In order to control the time during which a processor 1 or 2 is in either the first or second state, there will be seen a clock 7 shown in FIG. 1 having clock outputs 7a and 7b which are transmitted to the processors 1 and 2 for this purpose. Preferably, a first train of pulses is generated by the clock 7 and delivered on the clock output 7a. A second train of pulses is also generated by the clock 7 and delivered on the clock output 7b, however each pulse of the second train preferably occurs at a different time from that of the pulses of the first train. It will be appreciated that pulses of the first pulse train need not be the inverse of those of the second pulse train. More particularly, the clock 7 may be designed so that the pulses of one train do not overlap those of the other pulse train. It will also be noted that the $\phi$ 1 clock output 7a corresponds to the hereinbefore noted first half cycle and the $\phi$ 2 clock output 7b corresponds to the second half cycle of a processor's machine cycle.

Referring now to FIG. 2, there will be seen a timing diagram depicting the states which the processors 1 and 2 are operating in response to the $\phi$ 1 clock output 7a and $\phi$ 2 clock output 7b. From FIG. 2 it will be seen that when a $\phi$ 1 clock output 7a is presented to the processors 1 and 2, the processor 1 will be performing the previously noted internal operations whereas the processor 2 will be permitted to perform operations which may require inputting or outputting information such as access to the controller 3 or memory 4. Conversely, it will also be seen from FIG. 2 that when a φ 2 clock output 7b is presented to the processors 1 and 2, the situation is reversed, whereby the processor 1 may now either receive or transfer information to the controller 3 and memory 4, whereas the processor 2 is now performing internal functions. A closer examination of the φ 1 and φ 2 clock outputs 7a and 7b to the processors 1 and 2 reveals the manner in which this result is achieved. Specifically, it will be noted that the processors 1 and 2 are conventionally provided with φ 1 and φ 2 input ports such that when a signal is present at the φ 1 port, the processor will be commanded to operate in its internal state, whereas if a signal is present on the φ 2 input port, the processor will then be performing input and output functions. It will be seen that the φ 1 clock output 7a is transferred to the φ 1 input port of processor 1 and the φ 2 clock output 7b is, in like manner, transferred to the φ 2 input port of the processor 1. However, the φ 1 and φ 2 clock outputs 7a and 7b, respectively, are transferred to the opposite input ports in the case of the processor 2. In this manner, when a φ 1 clock output 7a is generated by the clock 7, it will cause the processor 1 to operate in the φ 1 state, and the processor 2 to operate in the φ 2 state. Conversely, when a φ 2 clock output 7b is generated from the clock 7, the processor 2 will thus be operating in the φ 1 state whereas the processor 1 will be operating in the φ 2 state. It will be recalled from previous discussion that a processor 1 or 2 is able to transmit or receive information only after an appropriate address command 1d and 1e, or 2b and 2d have been generated by their respective processors 1 and 2. Thus, it follows that if these address commands 1d and 1e or 2b and 2d are generated correlative to the φ 1 and φ 2 clock outputs 7a and 7b, the resulting effect is that access to the memory 4 and controller 3 by the processors 1 and 2 will thus be controlled and restricted to alternating respective machine half cycles, as previously described.

Referring now more particularly to the operation of the present invention, for purposes of illustration it will be assumed that controller-processor 5 will present on controller-processor output 5b well logging measurement data of lithological parameter in digital form, which was generated by the sonde 9. It will further be assumed that it is desired to process this data for video presentation or the like, whereby the data may be appropriately scaled for the display, and whereby additional related data must be generated, such as digital representations of reference "grid lines" to also be displayed, or the like. The controller 3 will preferably first be "loaded" in a manner well known in the art, as hereinbefore described, prior to receipt of such data, with all instructions, constant data, or the like necessary to carry out these processing steps. These may include, for example, instruction steps for the processors 1 and 2 necessary to cause them to generate a series of digital numbers in response to incoming measurements which, when plotted or displayed, will appear as the hereinbefore noted reference lines whose positions are correlative to such measurements. Also included in the controller 3 may be scaling constants, series of instructions to enable the processors 1 and 2 to perform particular arithmetic operations on measurement data, or to store in or retrieve data from the memory 4 in a desired manner for further calculations, for output to plotting devices, and the like.

Once the controller 3 has thus been loaded or initialized, the processor 1 will thus be prepared to begin receiving measurement data from the controller-processor 5 which, in turn, receives the data from the storage. The processor 1 will then generate sequences of address commands 1e so as to store this data by delivering it to the memory 4 on the controller output 1c. It will be noted that this data may be retrieved at a later time because the memory locations of this data in the memory 4 will be retained. In particular, by addressing the controller 3 in a manner previously described, instructions may be retrieved therefrom by the processor 1 or 2 on the controller outputs 3a and 3b, pertaining to the memory locations of this data in the memory 4. When the processor 1 has thus received and stored an initial section of well logging data, in response to instruction steps from the controller 3 on controller output 17, the processor 1 will then begin performing the functions or operations on this data which have been reserved for the processor 1 by the instructions stored in the controller 3. More particularly, as each step specified in the controller 3 calls for a calculation by the processor 1 on such data, the processor 1 will retrieve data from the memory 4 in the previously described manner, perform the calculations or processing in a manner specified by the instructions of the controller 3, and then restore the results in the memory 4, also in the previously described manner. This process will continue by the processor 1 of retrieving data, processing it, and restoring it in response to the steps specified in the controller 3. It will be noted that all data thus processed, corresponding to digital information to be displayed on one line of the display, hereinafter referred to as a "block", may be conveniently stored together in one area of the memory 4, and a memory location in the memory 4 may further be reserved to store a number correlative to the total number of such blocks which have been thus processed by the processor 1. Each time the controller 1 has completed processing of the last data of a particular block, the number previously stored in the memory location is retrieved from the memory 4 by the processor 1, incremented by 1, and restored in the memory location of memory 4, for reasons to be hereinafter explained.

Referring now to the processor 2, as the processor 1 completes performance of its operations on data, and restores it in the memory 4, the processor 2 will then, in like manner, begin retrieving this data from the memory 4, performing its functions on the data and restoring it in the memory 4, in preparation for reading it out to be plotted, displayed, or the like. As with the processor 1, the particular instructions to the processor 2 defining the operations or functions it must perform on this stored data will be defined in the steps stored in the controller 3, which may be addressed and read into the processor 2 at appropriate times previously described. In like manner to the processor 1, blocks of data corresponding to all information necessary to display a particular line may conveniently be stored in one area of the memory 4. When processing of a particular plot has been completed, the processor 2, in response to instructions from the controller 3 on the controller output, will generate a series of address commands 2b, causing this data to be sequentially read from the memory 4 to the controller 2 on the memory output 4b. Thereafter, this data will be transferred on the processor output 2c to the controller 13 and thereafter to the plotter 10, display 11, or recorder 12, as desired. In similar manner to the operation of the processor 1, each time the controller 2 has thus delivered a particular block of data to the controller 13 on processor output 2c, the number stored in the memory 4 correlative to the total number of such blocks to be processed by the processor 2 and thus available for plotting will be retrieved from the memory 4, decremented by 1, and restored in the memory 4 for each such block of data processed by the processor 2 and delivered on the processor output 2c to the controller 13. When processing of a particular plot has been completed, the processor 2, in response to instructions from the controller 3 on the controller output, will generate a series of address commands 2b, causing this data to be sequentially read from the memory 4 to the controller 2 on the memory output 4b. Thereafter, this data will be transferred on the processor output 2c to the controller 13 and thereafter to the plotter 10, display 11, or recorder 12, as desired. In similar manner to the operation of the processor 1, each time the controller 2 has thus delivered a particular block of data to the controller 13 on processor output 2c, the number stored in the memory 4 correlative to the total number of such blocks to be processed by the processor 2 and thus available for plotting will be retrieved from the memory 4, decremented by 1, and restored in the memory 4 for each such block of data processed by the processor 2 and delivered on the processor output 2c to the controller 13.

Referring now more particularly to the controller outputs 14–17 and 14a–17a, it will be appreciated that, as hereinbefore noted, the controller 3 has previously received and stored a series of instructions delivered initially from the processor 1 prior to the provision of logging data by the processor 1. These instructions correspond to the various functions which must be performed by the processors 1 and 2, and will include instructions to the processors 1 and 2 to either send or receive data, command signals or the like, and instructions regarding whether the data or command signals are to be received from or stored to the memory 4 or controller 3 on the one hand, or, on the other hand, whether such data and command signals will be sent to or received from the input or output terminal devices as hereinbefore noted. Accordingly, in FIG. 1, there will be seen command signals 14 and 14a which are delivered to the processors 1 and 2, respectively, by the controller 3 in response to the address commands 1d and 2b to deliver instructions to the respective processors 1 and 2 command signals causing them to perform various operations such as addition, subtraction of data, and the like. Still further, there will be seen terminal signals 15 and 15a also routed to their respective processors 1 and 2 for informing the processors 1 and 2 whether they are to deliver data or information signals to their respective terminal means or to the memory 4. Still further, thee will be seen signals 16 and 16a delivered from the controller 3 to their respective processors 1 and 2. These signals 16 and 16a command their respective processors 1 and 2 to either send data or command signals on the one hand, or receive them from the various sources specified by the terminal signals 15 and 15a, as hereinbefore noted.

What is claimed is:

1. A system for processing well logging measurements and the like, comprising:
    input means for providing electrical data signals to be processed,
    terminal means for receiving processed electrical data signals,
    pulse generating means for providing first and second electrical enabling pulse trains, said first pulse train being substantially 180 degrees out of phase from said second pulse train,
    memory means for receiving and delivering electrical data signals,
    first processing means interconnected with said input and memory means,
    second processing means interconnected with said memory and terminal means, and
    control means for generating and delivering command signals to said first and second processing means, wherein
    said first processing means receives and delivers data signals in response to said first pulse train and selected ones of said command signals and processes said received data signals in response to other different selected ones of said command signals and said second pulse train, and
    said second processing means receives and delivers data in response to said second pulse train and said selected one of said command signals and processes said received data in response to said other different selected ones of said command signals.

2. The system described in claim 1, wherein said second processing means receives and delivers data signals in response to said selected ones of said command signals and to said second train of said enabling pulses and processes received data signals in response to said other different command signals and said first train of said enabling pulses.

3. The system described in claim 2, wherein said pulse generating means comprises:
    clock means for generating a first train of discrete pulses having a width and rate of occurrence corresponding to the machine cycle of said first processor and a second train of discrete pulses having a width and rate of occurrence corresponding to the machine cycle of said second processor, and
    means for interconnecting said first and second trains of discrete pulses to said first and second processors.

4. The system described in claim 3, wherein said pulses in said second train are generated during the time intervals between the pulses in said first train of pulses.

5. The system described in claim 4, wherein the pulses in said second train each have a width which is less than the time intervals between the pulses in said first train of pulses.

6. The system described in claim 5, wherein the pulses in said first train of pulses each have a width which is less than the time intervals between the pulses in said second train of pulses.

7. A system for processing well logging measurements and the like, comprising:
    input means for providing electrical data signals to be processed,
    terminal means for receiving processed electrical data signals,
    generator means for providing first and second trains of discrete enabling pulses having preselected widths and rates of occurrence,
    memory means for storing said electrical data signals,
    controller means for generating a plurality of different electrical command signals,
    first processing means interconnected with said input means and said memory means for receiving and delivering electrical data signals in response to a first set of said command signals and to said first train of enabling pulses, said first processing means processing electrical data signals in response to a second set of said command signals and in response to said second train of enabling pulses, and second processing means interconnected with said terminal means and said memory means for receiving and delivering electrical data signals in response to a third set of said command signals and to said second train of enabling the pulses, said second processing means processing electrical data signals in response to a fourth set of said command signals and in response to said first train of enabling pulses.

8. A method of investigating a subsurface earth formation traversed by a borehole, comprising:

electrically generating a measurement signal corresponding to at least one characteristic of said formation, deriving first information signals from said measurement signal, storing said first information signals, registering a count of said stored first information signals, retrieving said first information signals, deriving from said retrieved first information signals second information signals, storing said second information signals, decrementing said registered count of said first information signals in response to said storing said second information signals, generating next first information signals as a function of said registered count, incrementing said registered count for each successive said next first information signal, monitoring said registered count, and inhibiting generation of said next first information signals when said registered count reaches a preselected number.

9. The method of claim 8, wherein said registering and decrementing steps further comprise:

incrementing a count in a discrete and preselected memory location in response to each said storing of said first information signals, and decrementing said count in said preselected memory locations in response to each said storing of said second information signals.

10. The method of claim 9, further comprising:

generating a first and second series of clock pulses, incrementing said count during at least one pulse of said first series, and decrementing said count during at least one pulse of said second series.

11. The method of claim 10, wherein said first series of clock pulses is substantially the inverse of said second series.

12. The method of claim 11, wherein said first and second information signals are stored in a substantially identical plurality of memory locations.

13. The method of claim 12, further including:

storing said first and said next first information signals during said at least one pulse of said second clock pulse series, and storing said second information signals during said at least one pulse of said first clock pulse series.

14. A system for processing well logging measurements and the like, comprising:

input means for generating electrical data signals to be processed, terminal means for receiving processed electrical data signals, first microprocessor means interconnected to said input means for receiving and processing said data signals, memory means connected to said first microprocessor means for storing and delivering said processed data signals, second processor means interconnected to said memory means and said terminal means for receiving and further processing said processed data signals, said memory means comprising preselected discrete memory locations for storing said processed data signals during a first time interval and said further processed data signals during a second time interval, clock means interconnected to said first and second microprocessor means for coordinating operation of said first and second microprocessor means, counter means for providing an indication of the total number of said processed and further processed data signals present in said memory locations, and control means for inhibiting said input means from generating said data signals when said indication from said counter means reaches a preselected number.

15. The system of claim 14, wherein said counter means further includes:

incrementing means for incrementing said indication of said counter means in response to said storing of said processed data signal, and decrementing means for decrementing said indication of said counter means in response to said delivery said processed data signals.

16. The system of claim 15, wherein said clock means further includes:

first clock pulse means generating first and second portion of a first pulse train for connecting said input means and said memory means to said first microprocessor means during said first portions of said first pulse train and for isolating said input means and memory means from said first microprocessor means during said second portions of said first pulse train, and second clock pulse means for generating first and second portions of a second pulse train for connecting said memory means and said terminal means to said second microprocessor means during said first portions of said pulse train and for isolating said memory means and said terminal means from said second microprocessor means during said second portions of said second pulse train.

17. The system of claim 16, wherein said first and second pulse trains are substantially 180 degrees out of phase 18. The system of claim 17, wherein said first and second pulse trains are square-wave pulse trains.

19. The system of claim 18, wherein said first and second pulse trains correspond to the respective machine cycles of said first and second microprocessors.

20. The system of claim 19, wherein said second pulse train is the inverse of said first train.

* * * * *